Sept. 7, 1954 S. FINGERHUT 2,688,580
METHOD OF FORMING FIBER GLASS REINFORCED RESIN SHEET
Filed Nov. 4, 1950
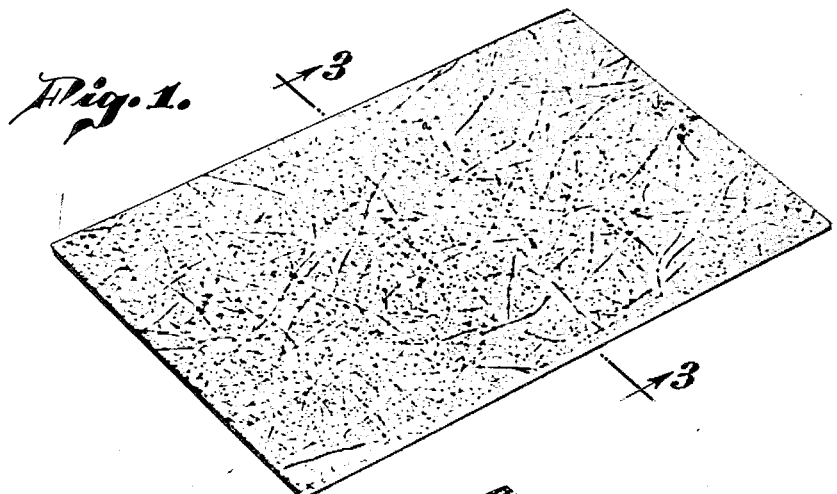
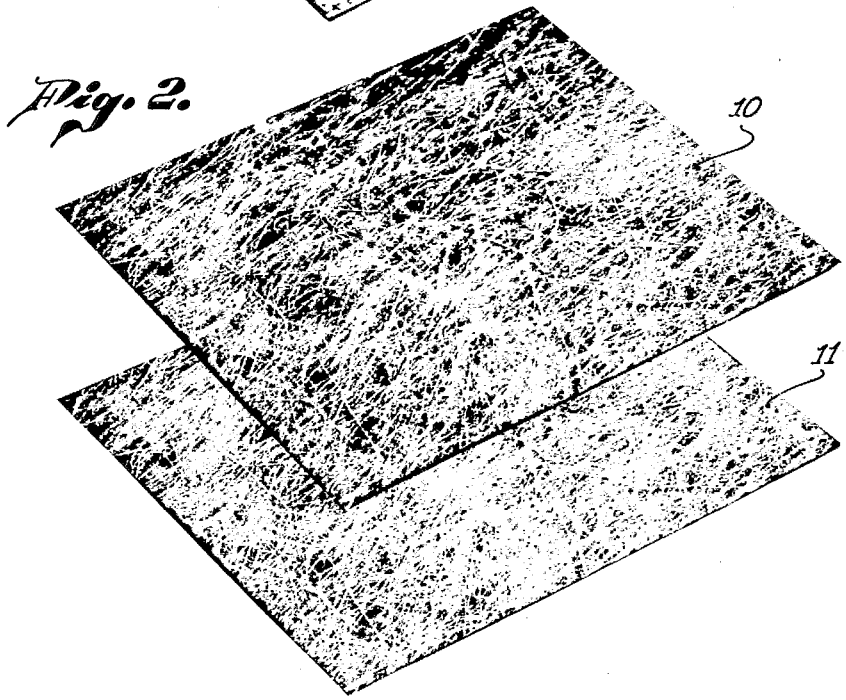
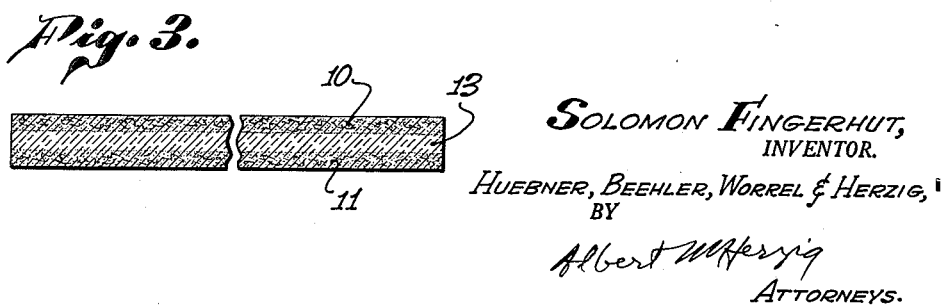
SOLOMON FINGERHUT,
INVENTOR.
HUEBNER, BEEHLER, WORREL & HERZIG,
BY
Albert M Herzig
ATTORNEYS.

Patented Sept. 7, 1954

2,688,580

UNITED STATES PATENT OFFICE 2,688,580

METHOD OF FORMING FIBER GLASS REINFORCED RESIN SHEET

Solomon Fingerhut, Los Angeles, Calif., assignor to Zenith Plastics Co., Gardena, Calif., a corporation of California Application November 4, 1950, Serial No. 194,178

2 Claims. (Cl. 154—100)

This invention relates to a fiber glass impregnated resin and method of making the same. More particularly it relates to a sheet plastic construction preferably in the form of a fiber glass laminate wherein such fiber glass or other strengthening and pattern-forming fibrous or like material, is disposed at or near the surface of the sheet and giving a contrasting color to the resinous sheet matrix, so as to be visible at least partially therethrough or therein.

Various means have been employed in the plastics art for embellishing or patterning plastic surfaces. It is particularly among the objects of this invention to provide a laminated sheet of plastic including a fibrous mat having desired strengthening properties while simultaneously imparting improved surface quality and appearance.

It is a further object of this invention to provide a laminated plastic product of improved durability, toughness, and appearance.

Another object of the invention is the provision of new and improved glossy, smooth or slightly roughened surface for achieving the herein described desired results.

Another further object of this invention is the provision of a new and improved method of laminating a sheet of plastic whereby the laminate is rendered visible through the body of the sheet as an ornamental feature thereof in contrasting color of the main body of such sheet.

Yet another object of this invention is the provision in a reversible sheet, of color and/or pattern-contrast as between opposite sides thereof, particularly with respect to the fibrous laminate imbedded therein.

This invention also contemplates among its objects provision for improvement of prior art products and methods heretofore intended to accomplish generally similar purposes.

Other objects and purposes will appear from the following specification, considered in the light of the accompanying drawings and appended claims.

In the drawing:

Figure 1 is a sheet of polymerized resinous material embodying this invention.

Figure 2 is an exploded view likewise in perspective, of fiber mass layers of optional contrasting color.

Figure 3 is a sectional view of the product embodying this invention taken as on a line 3—3 of Figure 1.

Referring more particularly to the drawing, any number of fiber and glass mats or preforms 10 and 11 can be used, two only being here shown in the form of a desired fibrous material, preferably fiber glass, but optionally sisal fibre, cotton, cellulose, rayon, or other like material. These are coated or dyed and then impregnated with resin of a contrasting color. The fibrous mats are placed adjacent the mold surface to retain a position at the corresponding surface or surfaces of the sheet (Figs. 1 and 3) preferably leaving a central fiber-free resinous region thereunder or therebetween, as at 13, Fig. 3.

The fiber glass or other mat, available commercialy as a preform, may in its preformed condition, be loosely held together with any well known adhesive or sizing agent, usually in a temporary manner.

The mat itself may be loosely or tightly packed, but preferably contains such a number of fibres that the mat transmits light readily. If desired the mat may be so sparsely or densely packed and formed as to give any desired degree of visibility therethrough, e. g., in the manner of either a loosely or tightly woven cloth.

The mat is of any depth, and can also be formed of several layers, optionally in spaced relationship to one another, on opposite sides of the final product (Fig. 1). Each outer layer, or at least the outer side of any layer is sprayed or otherwise colored, preferably with any desired dye or pigment. The coloring material, compatible with the proposed resin is then preferably permitted to dry and set so that the same will not run to create a pattern other than that intended when brought into contact with the resin. It is understood that if the dye runs other types of patterns may be formed.

Dye will penetate some types of fibres, but with others, such as fiber glass, the paint or dye merely provides a surface coating thereon.

The mat after forming, as on a flat-bed type felting machine and colored as aforesaid is placed, optionally together with any number of others, against or upon the platen of a mold. A fluid resin, of a color contrasting with that of the mat, which is transparent if desired, is then poured thereover.

The above procedure is cited as merely illustrative. It is also possible to lay a colored mat directly in a fluid body, or over a preformed layer, of resin. Additional fluid resinous material may be poured thereover, or a sheet of thermoplastic resin can be placed on one side or optionally between separate layers of the matting. Upon heat and pressure applied by means of complementary mold elements, the resin will be forced to penetrate the mat and entirely surround all the fibres in the mat except those at the surface of the sheet.

When the mat is laid directly upon the mold surface, the application of heat and pressure against the same and the body or matrix of plastic the relative positions of the resin and the mat will not change the position of the mat against the mold but the resin will flow about the fibres and flush against the mold surface thereadjacent.

The fibres, being in a contrasting color to the resin will appear through the surface of the latter after polymerization, with more or less distinctness depending upon their depth, the degree of opacity of the matrix and the extent to which the color of the matrix and the mat are in contrast. The distinctness of the color and contrast will also be determined by the proximity of the fibers to the surface of the finished product.

Thermo-setting resin is preferably applied in fluid condition and laminated by heat and pressure.

Referring again to the drawing, the mats 10 and 11 may be coated preferably by spraying, or by dipping, with any desired color, black for example. The mat may be sprayed with the same color on both sides or with a different color or colors on each side, provided the pre-selected color of the matrix contrasts therewith.

Upon molding, the matrix may be, let us say, creme in color, and upon completion of the molding and polymerization of the resin, the mat, or at least those fibers which are at the surface or immediately adjacent thereto will be visible in their contrasting black color imbedded in the surface of the completed product. The fibers will be sufficiently imbedded in said surface that it will be smooth or substantially so, depending upon the nature and condition of the mold, the desired end product, and the pressure employed.

The ends of any fibers will appear as a mottled pattern upon the surface of the finished sheet, and the fibres parallel to the surface or relatively so, will appear as straight or curved lines receding more or less from said surface.

It may be appreciated that the present construction not only forms a laminate, the fibrous mat of which is preferably though not necessarily wholly disposed at the surface or immediately adjacent thereto for ornamental purposes but which, in incorporating the fibrous mat, provides a laminate of considerable strength.

While the present construction has been described as particularly adapted to the formation of flat sheets of material, such sheets may be formed in any desired shape to accomplish the same general effect or an approximation thereof.

The product has been found particularly useful in the construction of sheet-formed chairs, table tops, bar tops, and the like. Sanded and polished surfaces may be achieved if desired by buffing and polishing the surface obtained and herein described. The same may also be given a transparent finishing coat of any desired depth.

Particular examples of materials found satisfactory for the purposes of this invention are now cited as illustrative:

Pigments provide a color source for the resin tending to make the same opaque so that the surface fibres alone become visible in the final product. In all cases the color, whether pigment or dye must be chemically compatible with the resin with which it is used. Titanium dioxide for white, ultramarine blue for blue, cadmium selenide for red, and chrome green for green are satisfactory resin pigments.

Generally, dyes soluble in aromatic solvents or through the use of a mutual solvent with the resin will serve. These and other dyes compatible with any selected resin tend to permit coloring of the resin with a preservation of translucency thereof so that fibres somewhat below the surface may be seen therethrough with variant distinctness, generally decreasing with depth.

For use with any of the above referred to pigments and dyes an unsaturated alkyd-styrene copolymer, sometimes referred to as polyester resin, is satisfactory. As is well known, an alkyd resin is the reaction product obtained by heating unsaturated fatty acids or an acid anhydride with a polyhydroxy alcohol and which is then dissolved in a monomer such as styrene to form a polyester resin. These polyester resins polymerize by an addition type polymerization under the influence of light, heat, and catalyst.

Polystyrene is of a type of suitable thermoplastic resin.

The selected resin is colored with a selected pigment by grinding the latter thereinto or into a carrier compatible with the pigment. The colored resin is then preferably poured, if thermo setting, over a mat or pre-formed fibrous laminate the fibres of which are at random with one another. The fibres must therefore have been coated or sprayed with a suitable dye, pigment, or other paint or color.

Suitable binding agents are usually required, not alone for retaining the fibrous mat in a desired shape and condition, but also to hold the required color on or against the individual fibres.

Thus for example, aqua black, phthalocyamine blue, phthalocyamine green, vat dyes or other preferably water-soluble basic dyes can be used, for coloring the fibres.

If such colors as above exemplified, are used, then binding agents such as urea-formaldehyde, melamine-formaldehyde, water soluble styrene-maleic anhydride copolymer, water soluble phenol formaldehyde, alcohol soluble alkyl starch, or an emulsion of styrene-polyester are suitable.

In order to give the fibres their desired precoloring, the colors are mixed into the binding agent. The colored agent is then preferably sprayed upon the fibrous mat thereby coating and coloring primarily the outer surfaces of the outermost fibres. Both or only one side of the mat may be thus colored. Dipping of the mat is also possible but is not preferred.

The colored mat is baked as in an oven or mold until the binder is cured, usually at approximately 250 to 300 degrees Fahrenheit for approximately 3 to 15 minutes.

The colored mat is then laid or placed in a mold, colored side against the mold surface. The colored resin is poured thereover moulded and cured, again e. g., at approximately 250 to 300 degrees Fahrenheit for approximately 3 to 15 minutes, preferably with the aid of a suitable catalyst, a peroxide catalyst such as benzyl peroxide or tertiary butyl-hydro-peroxide being satisfactory.

The catalyst is usually added in the amount of 1% by weight relative to the weight of the resin.

The binding agent is preferably 2 to 10% by weight relative to the weight of the mat.

As examples, satisfactory resinous sheets were made according to the teaching of this invention as follows:

Example 1

.1% of aqua black in a 5% water solution of urea formaldehyde was sprayed on both sides of a 3/16" fibre-glass mat and cured in an oven at approximately 300 degrees Fahrenheit for approximately 5 minutes. It was then taken from the oven, placed on a mold and a polyester resin, colored with .01% of a red dye, was poured thereover, molded, and cured at the same temperature and for the same time as above stated under a pressure of 150 pounds per square inch to form a flat sheet of polymerized reddish laminated resin having a distinguishing variegated random black pattern visible on the surface and partly into the body thereof formed by the colored fibres.

Example 2

A water dispersion of copper phthalocyamine blue .01% solution in a 5% aqueous solution of styrene maleic anhydride copolymer solution (ammoniacal) was sprayed on a fibre pre-form. The pre-form was dried at 250 degrees Fahrenheit for 5 minutes. To an unsaturated alkyd styrene copolymer resin was added 1% of benzoyl peroxide and 2% of titanium dioxide. The resin was then poured on the pre-form which latter was previously placed in a mold. The mold was closed and the resin cured for 3 minutes at 235 to 350 degrees Fahrenheit, at a mold pressure of 5 to 100 lbs. per square inch.

Example 3

.5% of a yellow vat dye was dispersed in a 7% aqueous solution of melamine formaldehyde, sprayed on a fibre-glass mat, and heated for 5 minutes at 325 degrees Fahrenheit.

Unsaturated alkyd styrene copolymer resin was catalyized with 1% of cumene hydroperoxide. .5% black dye was mixed into the resin, poured on the fibre-glass pre-form and molded at 250 degrees Fahrenheit for 3 minutes, with low pressure.

It is possible to make a resinous product in accordance with this invention by mere surface contact of the mold during curing. However bubbles are likely to form or remain too readily. Entrapped air is best removed by subjecting the combined materials to a curing pressure of sufficient magnitude to eliminate air pockets while thereby more clearly forming the surface with integral fibres in the plane thereof. Molding pressures of from 75 to 200 pounds have been used with excellent results. Any molding pressures suitable to the resin and desired product are also possible.

The amount of fibres used and their density relative to the resin is subject to some variation depending on the strength and pattern desired, but a preferred quantity is such as can be deposited or felted to the thickness of the ultimate plastic sheet desired upon a wire screen as commercially employed in making a mat of the corresponding fibres, usually with the aid of an air stream or partial vacuum. A preferred proportion of fibres to resin is approximately 1 part to 4 by weight. A range of 20 to 30% by weight of fibre-glass is good, but from 15 to 45% is permissible.

Although I have herein shown and described my invention in what I have considered to be the most practical and preferred embodiment, it is recognized that departures may be made therefrom within the scope of my invention, which is not to be limited to the details disclosed herein but is to be accorded the full scope of the claims so as to embrace any and all equivalent structures and methods.

Having described my invention, what I claim as new and desire to secure by Letters Patent is:

1. The method of forming a plastic laminate, comprising the steps of: depositing fibers in random arrangement over other fibers so deposited to form a loose fibrous mat, coating the fibers of said mat with a colored binding agent, placing and holding the mat against the bottom surface of a mold, pouring a liquid thermosetting resin over said mat to fill the interstices of and cover the same and to completely encompass all the fibers thereof except those in contact with said mold surface, and curing the resin by heat and pressure to form a solid laminate.

2. The method of forming a plastic laminate, comprising the steps of: depositing fibers in random arrangement over other fibers so deposited to form a loose thin mat of randomly arranged fibers, coloring the fibers of said mat with a color-containing material, placing and holding said mat against a surface of a mold, thereafter filling the interstices of said mat with a contrastingly colored resinous material, compatible with said color-containing material to completely encompass all the fibers thereof except those in contact with said mold surface, and curing said resinous material to produce a solid unitary laminate wherein some of said fibers partially define one of the surfaces and are visible at said surface.

References Cited in the file of this patent

UNITED STATES PATENTS

| Number | Name | Date |
| --- | --- | --- |
| 1,881,932 | Powell | Oct. 11, 1932 |
| 2,176,837 | Ellis | Oct. 17, 1939 |
| 2,204,859 | Hyatt et al. | June 18, 1940 |
| 2,206,059 | Slayter | July 2, 1940 |
| 2,215,061 | Alt | Sept. 17, 1940 |
| 2,263,900 | Nollau | Nov. 25, 1941 |
| 2,311,613 | Slayter | Feb. 16, 1943 |
| 2,315,329 | Hood et al. | Mar. 30, 1943 |
| 2,417,384 | Switzer | Mar. 11, 1947 |
| 2,450,902 | Marberg | Oct. 12, 1948 |
| 2,495,636 | Hoeltzel et al. | Jan. 24, 1950 |
| 2,566,960 | Philipps | Sept. 4, 1951 |